United States Patent [19]

Royse et al.

[11] Patent Number: 4,735,227

[45] Date of Patent: Apr. 5, 1988

[54] TURBINE FLOW METER VISCOSITY CONTROL

[75] Inventors: Edwin H. Royse, Dallas; John A. Holstein, Ft. Worth, both of Tex.

[73] Assignee: Royse Manufacturing Company, Inc., Dallas, Tex.

[21] Appl. No.: 918,490

[22] Filed: Oct. 14, 1986

[51] Int. Cl.[4] ............................................. G05D 11/13
[52] U.S. Cl. ........................................ 137/92; 73/54
[58] Field of Search ............................... 73/54; 137/92

[56] References Cited

U.S. PATENT DOCUMENTS

| | | | |
|---|---|---|---|
| 2,208,444 | 7/1940 | Bailey | 137/92 |
| 2,590,538 | 3/1952 | Huck | 137/92 |
| 2,630,819 | 3/1953 | Norcross | 137/92 |
| 3,557,817 | 1/1971 | Royse | 137/91 |
| 4,184,364 | 1/1980 | Bae | 73/54 |

Primary Examiner—Robert G. Nilson
Attorney, Agent, or Firm—Richards, Harris, Medlock & Andrews

[57] ABSTRACT

A viscosity control (10, 200) is disclosed which employs a turbine flow meter (52). A pump (18) provides for a flow of solution through a conduit at a relatively constant pressure. The flow rate of the solution through the conduit thus varies depending on the viscosity of the solution. The turbine of the flow meter rotates at an angular velocity related to the flow rate. The rotational velocity of the turbine is sensed. When the turbine speed decreases as viscosity increases to a set maximum viscosity, the control supplies solvent to the solution to decrease the viscosity.

13 Claims, 2 Drawing Sheets

TURBINE FLOW METER VISCOSITY CONTROL

TECHNICAL FIELD

This invention relates to the printing industry, in particular to a control system for maintaining the viscosity of an ink solution in a desired range by selective addition of a solvent.

BACKGROUND OF THE INVENTION

The typical inks used in the flexographic printing industry must be mixed with a solvent, such as alcohol or water, to form a usable ink solution with an acceptable viscosity. Because the solvents are so volatile, evaporating to the atmosphere, solvent must be continuously added to the ink solution to maintain the desired viscosity.

Different control apparatus have been developed in an attempt to maintain a solution at a desired viscosity. U.S. Pat. No. 3,557,817 issued on Jan. 26, 1971 to Edwin H. Royse discloses one apparatus for mixing fluids of different specific gravity to maintain a solution with the desired properties. U.S. Pat. No. 3,848,618 issued Nov. 19, 1974 to Edwin H. Royse discloses another device for mixing fluids of different specific gravities to maintain a solution of desired properties.

While the devices previously designed, including those disclosed in the patents above, are satisfactory in many aspects, a need still exists for an improved control system for maintaining the viscosity of an ink solution within the desired range. A critical consideration is the difficulty in maintaining such a control system. A complex and multicomponent system can often require excessive time for cleaning and maintenance, compromising the very purpose for the control system to eliminate labor intensive maintenance.

SUMMARY OF THE INVENTION

In accordance with one aspect of the present invention, an apparatus is provided for maintaining the viscosity of an ink solution within a desired viscosity range by providing solvent to the solution. The apparatus includes structure for defining a flow path for flow of ink solution along the flow path. Pump structure is provided for pumping the ink solution along the flow path at a relatively constant pressure so that the flow rate of the ink solution varies with the viscosity of the ink solution. A turbine flow meter is provided which has a turbine in the flow path. The turbine speed varies with the flow rate of the ink solution along the flow path. Structure is also provided for sensing the turbine speed and for adding solvent to the ink solution when the turbine speed sensed indicates the viscosity is outside the desired range.

In accordance with another aspect of the present invention, a flow restriction is placed within the flow path downstream of the turbine to maintain the relatively constant pressure. In accordance with another aspect of the present invention, the ink solution is stored in a supply tank. The pump structure pumps ink solution from the supply tank through the flow path. Structure is provided for sensing the level of ink solution in the supply tank and adding ink to the supply tank when the level falls below a minimum level. In accordance with yet another aspect of the present invention, structure is provided for adjustably setting the predetermined speed of the turbine which initiates solvent input.

BRIEF DESCRIPTION OF THE DRAWINGS

For a more complete understanding of the present invention and for further advantages thereof, reference is now made to the following Description taken in conjunction with the accompanying Drawings, wherein.

DETAILED DESCRIPTION

Figure 1:
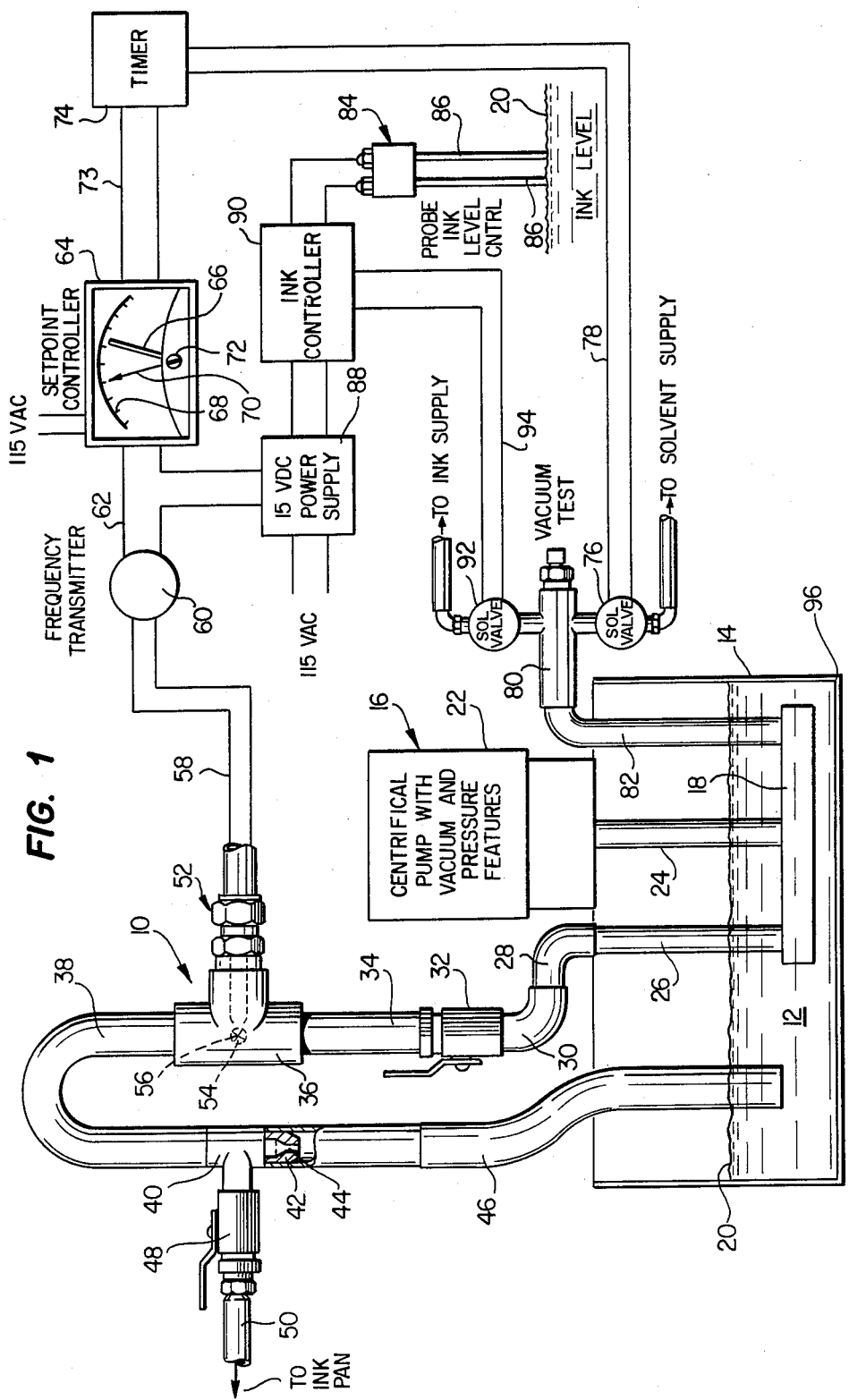
FIG. 1 is a schematic view of a first embodiment of the present invention.

With reference now to the accompanying FIG. 1, a viscosity control 10 is illustrated for controlling the viscosity of an ink solution 12 by periodically adding a solvent, typically alcohol or water.

The ink solution 12 is stored in a supply tank 14 for eventual supply to an ink pan (not shown) which is part of the actual printing machine. With many solvents, including alcohol, the ratio of ink and solvent will be a nonstable ratio because the solvent will evaporate. As the solvent evaporates, the viscosity of the ink solution increases. If solvent is not added on a periodic basis, the viscosity of the ink solution may become too high for proper operation of the printing press.

A pump assembly 16 is associated with the supply tank 14. The assembly 16 includes a centrifugal pump 18 set within the supply tank 14 below the desired minimum ink level 20. A motor 22 drives a centrifugal pump through a motor shaft (not shown) contained within a fluid housing 24 extending into the ink solution to the pump. The pump is operated and draws ink solution from supply tank 14 into an inlet and pumps the ink solution from the pump to outlet pipe 26 extending from the supply tank 14. Outlet pipe 26 leads to a pair of 90° elbows 28 and 30. An on/off valve 32 is connected to elbow 30. A nipple 34 extends from the on/off valve to a tee 36. Another branch of the tee connects to a U-shaped pipe 38. A second tee 40 is secured to the U-shaped pipe 38. A restrictor section 42 having a restriction orifice 44 is connected to one leg of tee 40. A return pipe 46 is connected to section 44 downstream of orifice 44 which ends in the ink solution within the supply tank 14. Thus, a continuous recirculating flow path is defined through these elements whereby the pump pumps the ink solution from the supply tank about the circuit to return to the supply tank. The actual ink solution delivered to the ink pan is drawn off from the third port of tee 40 through an on/off valve 48 and pipe 50 to the ink pan (not shown).

The third port of tee 36 is employed to mount a turbine flow meter 52. Meter 52 includes a turbine 54 which is mounted in the flow path through the tee 36 so that ink solution pumped through the tee will spin the turbine about its rotational axis 56. The angular velocity of rotation of the turbine 54 about axis 56 will be a function of the flow rate of ink solution through the tee 36.

Preferably, the turbine flow meter 52 is of a type using a magnetic pick-up to generate an electrical signal of a frequency related to the speed of rotation of the turbine 54. The electrical signal is transferred through signal wires 58 to a frequency transmitter 60. Frequency transmitter 60 is powered from power supply 88 and acts to transform the frequency signal to a voltage related to the frequency.

The voltage signal from transmitter 60 is transmitted through signal connection 62 to a set point controller 64. The voltage generated by the transmitter 60 deflects an instrument needle 66 within the controller. When the turbine speed is zero, no voltage is transmitted by transmitter 60 to the controller 64 and the instrument needle 66 falls to the zero position on the scale 68. As the turbine speed increases, the voltage from transmitter 60 to controller 64 will increase, deflecting the needle 66 upscale.

The controller also contains a set point needle 70 which can be adjustably set on scale 68 by a set point control 72. When the needle 66 is at the same point or downscale of the set point needle 70, a contact is closed within the controller to close a circuit 73 extending from controller 64 to a timer 74.

When the circuit to the timer 74 is closed, the timer will activate a solenoid valve 76 through control lines 78 to permit solvent to flow from a solvent supply source (not shown) into the supply tank. The solvent passes into a tee 80 and from there into an inlet tube 82 connected to the suction side of the pump 18. A suction is created by the pump within the inlet pipe 82 which causes solvent to flow from the supply into the pump when the solenoid valve is opened.

The timer 74 is set to maintain the solenoid valve in the open position only for a predetermined increment of time. The timer then permits the solenoid valve 76 to close. If sufficient solvent has been added to reduce the viscosity, and thus increase the speed of turbine 54 so that the needle 66 reads upscale of set point needle 70, no additional solvent will be needed. However, if insufficient solvent has been provided in the first cycle, the timer will reopen the solenoid valve 76 after a second predetermined time increment has elapsed and will continue the cycle until sufficient solvent has been added to decrease the viscosity until the ink solution viscosity is in the desired viscosity range.

An ink level sensor 84 is also provided which employs two probes 86 which end at the desired minimum ink level 20 within the supply tank 14. When the ink solution level is at or above the minimum level, the probes 86 are surrounded by the ink solution, which permits a small current to flow between the probes. The power source for this current flow is the power supply 88. An ink controller 90 is positioned within the circuit between the power supply and ink level sensor. If the circuit is open, i.e., by the ink solution falling below the desired minimum ink level 20, the ink controller will activate a solenoid valve 92 through circuit 94 to permit ink to travel from an ink supply (not shown) through the solenoid valve, tee 80 and into the inlet pipe 82. Again, the pump creates a vacuum in the inlet pipe 82 which draws in the ink from the supply. Ink will be added until the ink solution level again rises to the minimum level 20 which reinstates the current flow through the probes.

As can be understood, the pump 18 provides for circulation of the ink solution at a relatively constant pressure, assisted by the restriction orifice 44. With a constant pressure, the flow rate of the ink solution will vary as the viscosity varies. Typically, as viscosity increases the flow rate will decrease. The turbine flow meter 52 functions to measure the flow rate past the turbine 54 and thus also indicates the viscosity of the ink solution. For a given application, the set point needle 70 can be set by control 72 to provide maintenance of the ink solution viscosity below a predetermined maximum level.

Preferably, a preheat device 96 is employed to preheat the ink solution 12 when operation is first initiated. As can be appreciated, the continuous flow of the ink solution driven by the pump 18 will provide some frictional heating of the ink solution, which has an effect on its viscosity. The preheat device 96 is intended to bring the temperature of the ink solution 12 quickly to the steady state temperature to allow rapid adjustment of the set point controller.

In one device constructed in accordance with the teachings of the present invention, a turbine flow meter is employed which has a flow range of 0.5 to 5 gallons per minute in a flow line of ½ inch diameter. The frequency of signals generated by rotation of the turbine within the turbine flow meter varies from 0 to 500 Hertz, corresponding to the range of zero flow to maximum flow through the associated line. The frequency transmitter associated with the turbine flow meter will convert the signal frequency to a voltage which varies from 10 millivolts to 500 millivolts related directly to the signal frequency. The flow meter was manufactured by E. F. M. Flow Meter Co. of Garland, Tex.

Figure 2:
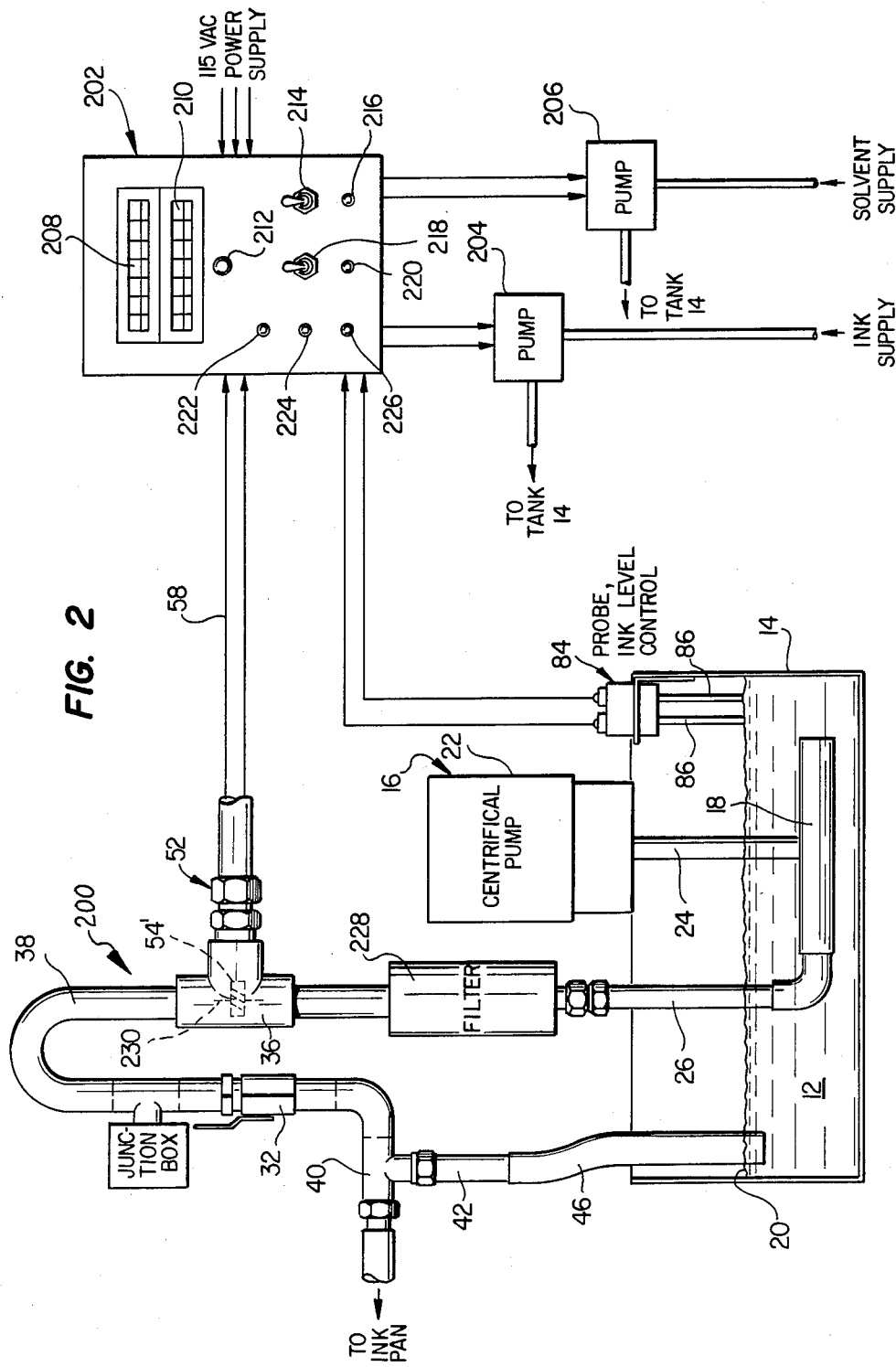
FIG. 2 is a schematic view of a second embodiment of the present invention.

FIG. 2 illustrates a viscosity control 200 forming a second embodiment of the present invention. A number of elements in control 200 are identical in function to those in control 10 and these elements are identified by the same reference numerals.

In viscosity control 200, the signal output from turbine flow meter 52 and ink level sensor 84 feed directly into control module 202 for processing. When additional ink is required, control module 202 will cause positive displacement pump 204 to operate to pump a desired quantity of ink from the ink supply to supply tank 14. When a need for additional solvent is sensed, control module 202 will cause positive displacement pump 206 to operate to pump a desired quantity of solvent from the solvent supply to supply tank 14. Preferably, pumps 204 and 206 are of the peristaltic type. Pumps 204 and 206 having a pumping capacity of between 6 and 20 gallons/day would be suitable for the viscosity control 200.

Control module 202 provides a visual display of actual flow viscosity on scale 208 and of the viscosity set point on scale 210. Adjust knob 212 provides for adjustment of the setpoint. Switch 214 turns power on and off to control module 202 and indicator light 216 indicates the power condition. Switch 218 and indicator light 220 provide ink level control. Indicator light 222 indicates a balanced ink solution. Indicator light 224 indicates a caution for abnormal balance in the ink solution. Indicator light 226 is an alarm for zero flow conditions in the flow meter, indicating flow blockage.

The control 200 has a strainer in the inlet to pump 18 and a separate filter 228 in the flow path upstream of turbine flow meter 52. These filters catch paper lint present in supply tank 14 due to ink pan return flow to prevent clogging of the meter 52. The meter 52 in control 200 uses a turbine 54' in the flow path for rotation about an axis 230 which parallels the flow as the flowing ink solution impinges on the curved turbine blades on turbine 54'. The rotational velocity of the turbine 54' is sensed by magnetic pickup.

The flow restrictor section 42 is relocated downstream of the branch to the ink pan. Also on/off valve 32 is positioned between tee 40 and meter 52.

Though the present invention has been described for use in the flexographic printing industry with alcohol as the solvent, the invention can also be used for inks where water forms the solvent by simply substituting a water source for the alcohol source. Also, the present invention can be employed with other viscous materials used in other industries that require the use of solvent.

While several embodiments of the present invention have been described in detail herein and shown in the accompanying Drawings, it will be evident that various further modifications and substitutions of parts and elements are possible without departing from the scope and spirit of the invention.

What is claimed is:

1. An apparatus for maintaining the viscosity of a solution in a desired viscosity range by providing solvent to the solution, the solution being formed of a material and solvent and the solution being stored in a supply tank, comprising:
    means for defining a flow path for flow of solution along the flow path;
    pump means for pumping the solution along the flow path at a relatively constant pressure so that the flow rate of the solution varies with viscosity, said pump means pumping solution from the supply tank along the flow path;
    a turbine flow meter having a turbine in the flow path with the turbine speed determined by the flow rate of solution in the flow path;
    a positive displacement pump for pumping solvent from a solvent supply to the solution;
    means for sensing the turbine speed and for activating the positive displacement pump to add solvent to the solution when the turbine speed sensed falls below a set speed, indicating the viscosity of the solution is outside the desired range; and
    means for sensing the level of solution in the supply tank and adding material to the supply tank when the level sensed falls below a minimum level.

2. The apparatus of claim 1, wherein said flow path means further includes a flow restriction in the flow path downstream of the turbine to maintain said relatively constant pressure.

3. The apparatus of claim 1, further comprising means for adjustably setting the set turbine speed resulting in inflow of solvent to the solution.

4. The apparatus of claim 1, wherein said sensing means adds solvent to the solution for a predetermined time interval.

5. The apparatus of claim 1, wherein said flow path means defines a conduit, said pump means pumping the solution through the conduit at the predetermined pressure, a tee being provided in the conduit to supply a predetermined rate of solution to a device, with the excess solution returing to the supply tank.

6. An apparatus for maintaining the viscosity of an ink solution within a desired viscosity range by providing solvent to the ink solution, a supply tank containing the ink solution, an ink supply and solvent supply also being provided, comprising:
    a conduit defining a flow path;
    a pump for pumping ink solution from the supply tank through the flow path in the conduit at a relatively constant pressure;
    a turbine flow meter having a turbine positioned in the flow path within the conduit, the speed of rotation of the turbine being porportional to the flow rate of ink solution through the conduit;
    means for drawing off a selected quantity of ink solution downstream of the turbine within the flow path of the conduit for delivery to a printing machine, the excess ink solution being returned to the supply tank;
    means for sensing the rotational velocity of the turbine and transforming the velocity sensed to a voltage;
    a set point controller having a volt meter for indicating the voltage sensed by said turbine speed sensing means and a variable set point voltage, said controller being activated when the voltage corresponding to the turbine speed is not exceeding the set voltage;
    a solvent supply path for providing solvent from the solvent supply to the inlet of the pump through a solenoid operated on/off valve;
    a timer for opening the solenoid valve to provide solvent from the supply to the inlet of the pump when the set point controller is activated, said timer maintaining the solenoid open for a first predetermined time period and then shutting the valve, said timer reopening the valve after a second predetermined time interval and cycling the solenoid valve between open and closed positions until the set point controller is deactivated;
    an ink level sensor mounted in the supply tank for sensing a decrease of ink solution level below a desired minimum level; and
    an ink supply path for providing ink from the ink supply to the inlet of the pump, said path having a solenoid operated on/off valve activated by said ink level sensor to provide ink from the ink supply to the supply tank when the sensor senses the ink solution level below the desired minimum level.

7. An apparatus for maintaining the viscosity of a material and solvent solution in a desired viscoity range by adding solvent to the solution, said solution being stored in a supply tank, comprising:
    means for defining a flow path for flow of solution along the flow path;
    pump means for pumping the solution along the flow path at a relatively constant pressure so that the flow rate of the solution varies with viscosity, said pump means pumping solution from the supply tank along the flow path;
    a turbine flow meter having a turbine in the flow path with the turbine speed determined by the flow rate of solution in the flow path;
    means for sensing the turbine speed to generate a signal relating to viscosity;
    a positive displacement pump for pumping solvent from a solvent supply to the solution;
    means for activating said positive displacement pump to add solvent when a predetermined viscosity signal is generated indicating the need for additional solvent in the solution; and
    means for sensing the level of solution in the supply tank and adding material to the supply tank when the level sensed falls below a minimum level.

8. The apparatus of claim 7, wherein said flow path means further includes a flow restriction in the flow path downstream of the turbine to maintain said relatively constant pressure.

9. The apparatus of claim 7, further comprising means for adjustable setting the predetermined viscosity signal resulting in inflow of solvent to the solution.

10. The apparatus of claim 7, wherein said activating means adds solvent to the solution for a predetermined time interval.

11. The apparatus for claim 7, wherein said flow path means defines a conduit, said pump means pumping the solution through the conduit at the relatively constant pressure, a tee being provided in the conduit to supply a predetermined rate of solution to a device, with the excess solution returning to the supply tank.

12. The apparatus of claim 7 wherein said means for adding material includes a positive displacement pump to supply material to the supply tank.

13. An apparatus for maintaining the viscosity of an ink solution within a desired viscosity range by providing solvent to the ink solution, a supply tank containing the ink solution, an ink supply and solvent supply also being provided, comprising;
 a conduit defining a flow path;
 a pump for pumping ink solution from the supply tank through the flow path in the conduit at a relatively constant pressure;
 a turbine flow meter having a turbine positioned in the flow path within the conduit, the speed of rotation of the turbine being proportional to the flow rate of ink solution through the conduit;
 means for drawing off a selected quantity of ink solution downstream of the turbine within the flow path of the conduit for delivery to a printing machine, the excess ink solution being returned to the supply tank;
 means for sensing the rotational velocity of the turbine and transforming the velocity sensed to a voltage;
 a set point controller having a volt meter for indicating the voltage sensed by said turbine speed sensing means and a variable set point voltage, said controller being activated when the voltage corresponding to the turbine speed is not exceeding the set voltage;
 a solvent supply path for providing solvent from the solvent supply to the inlet of the pump through operation of a positive displacement pump;
 a timer for activating the positive displacement pump to provide solvent from the supply to the inlet of the pump when the set point controller is activated, said timer maintaining the positive displacement pump activated for a first predetermined time period and then deactivating the positive displacement pump, said timer reactivating the positive displacement pump after a second predetermined time interval and cycling the positive displacement pump between activation and deactivation unless the set point controller is deactivated;
 an ink level sensor mounted in the supply tank for sensing a decrease of ink solution level below a desired minimum level; and
 an ink supply path for providing ink from the ink supply to the inlet of the pump, said path having a second positive displacement pump activated by said ink level sensor to provide ink from the ink supply to the supply tank when the sensor senses the ink solution level below the desired minimum level.

* * * * *

UNITED STATES PATENT AND TRADEMARK OFFICE
CERTIFICATE OF CORRECTION

PATENT NO. : 4,735,227

DATED : April 5, 1988

INVENTOR(S) : Edwin H. Royse
John A. Holstein

It is certified that error appears in the above-identified patent and that said Letters Patent is hereby corrected as shown below:

Column 6, line 34, change "viscoity" to --viscosity--.

Signed and Sealed this

Thirty-first Day of January, 1989

*Attest:*

DONALD J. QUIGG

*Attesting Officer*   *Commissioner of Patents and Trademarks*